United States Patent [19]
Puhl et al.

[11] Patent Number: 5,365,585
[45] Date of Patent: Nov. 15, 1994

[54] METHOD AND APPARATUS FOR ENCRYPTION HAVING A FEEDBACK REGISTER WITH SELECTABLE TAPS

[75] Inventors: Larry C. Puhl, Sleepy Hollow; Louis D. Finkelstein, Wheeling, both of Ill.

[73] Assignee: Motorola, Inc., Schaumburg, Ill.

[21] Appl. No.: 114,804

[22] Filed: Aug. 30, 1993

[51] Int. Cl.⁵ .......................... H04L 9/00; G06F 1/02
[52] U.S. Cl. ........................................ 380/9; 380/46; 380/49; 380/50; 331/78; 364/717
[58] Field of Search ................... 380/9, 43, 46, 49, 50; 364/717; 331/78

[56] References Cited

U.S. PATENT DOCUMENTS

| | | | |
|---|---|---|---|
| 4,864,525 | 9/1989 | Kurihara et al. | 364/717 |
| 4,974,184 | 11/1990 | Avra | 364/717 |
| 5,060,265 | 10/1991 | Finkelstein | 380/46 |
| 5,222,142 | 6/1993 | Kent | 380/46 |
| 5,235,423 | 8/1993 | Dunbar et al. | 380/46 X |
| 5,239,294 | 8/1993 | Flanders et al. | 340/825.34 |

OTHER PUBLICATIONS

Beker, Henry and Piper Fred, *Cipher Systems, The Protection of Comunications*, Northwood Books, London, Published 1982, Chapter 5, "Linear Shift Registers", pp. 175-215.

Peterson, W. Wesley and Weldon, Jr., E. J., *Error-Correcting Codes* Second Edition, The MIT Press, Copyright 1972, "Appendix C", pp. 472-492.

Bardell, Paul H., "Analysis of Cellular Automata Used as Pseudorandom Pattern Generators", paper presented at 1990 International Test Conference, Paper 34.1, CH2910-6/0000/0762$01.00, IEEE.

*Primary Examiner*—Bernarr E. Gregory
*Attorney, Agent, or Firm*—Shawn B Dempster; Kevin A. Buford

[57] ABSTRACT

A method and apparatus for generating a pseudo-random bit sequence is provided. A first input bit is determined as a function of bits stored in a shift register in accordance with a first feedback algorithm. In addition, a second input bit is determined as a function of bits stored in the shift register in accordance with a second feedback algorithm. Subsequently, a particular input bit to be provided to the shift register is deterministically selected from the group consisting of the first input bit and the second input bit such that a non-linear pseudo random sequence may be produced by the shift register. In addition, a communication unit which utilizes the pseudo-random bit sequence in encrypting a signal to be transmitted and decrypting a received signal is described.

17 Claims, 1 Drawing Sheet

METHOD AND APPARATUS FOR ENCRYPTION HAVING A FEEDBACK REGISTER WITH SELECTABLE TAPS

FIELD OF THE INVENTION

The present invention relates to communication systems and, more particularly, to encryption within communication systems in which a feedback register output is used as an encryption variable. This feedback register includes selectable taps to protect it from cryptographic attack.

BACKGROUND OF THE INVENTION

Many communications systems currently use encryption to enhance security of the systems. These communication systems include but are not limited to cellular radio telephone communication system, personal communication systems, paging systems, as well as wireline and wireless data networks. By way of example a cellular communication system will be described below; however, it will be appreciated by those skilled in the art that the encryption techniques described can be readily extended to other communication systems without departing from the scope and spirit of the present invention.

Turning now to cellular communication systems, these systems typically include subscriber units (such as mobile or portable units) which communicate with a fixed network communication unit via radio frequency (RF) communication links. In cellular communication systems, the RF communication link is the primary target for cryptographic systems, because it is the most vulnerable to unauthorized introduction (spoofing) or extraction (eavesdropping) of information. It is well known in the art that information in these communication links may be cryptographically protected by encrypting them with a pseudo-noise (PN) signal which is pseudo-random in nature. For example this may be accomplished by performing an exclusive-or operation of an information signal with a PN signal, prior to transmission. Subsequently, the inverse operation can be performed during the receiving process.

The PN signals are not truly random, but appear random when subject to cursory inspection. The advantage of these PN signals is that they can be easily generated by a linear feedback shift register (LFSR). An LFSR generates a PN signal which is periodic (i.e., deterministic). The periodicity of the PN signal is dependent on the number of stages (i.e., bits stored) in the register, the feedback "taps", and the initial state of the LFSR stages. The LFSR implements an Nth degree polynomial (where N is the number of stages of the LFSR) by having one feedback signal "tap" (output bit of a stage) for each coefficient of the polynomial. An input bit is formed from an exclusive-or operation on the outputs of these feedback signal "taps" and feed back into the register. Ideally feedback "taps" can be chosen which implement a maximal length PN signal generator. A maximal length PN generator generates a pseudo random sequence which repeats every $2^N - 1$ cycles, where N is the number of stages in the in the register. Examples of maximal length feedback tap arrangements for several different stage length registers are given in "Error-Correcting Codes", second edition by W. Wesley Peterson and E. J. Weldon, Jr., MIT Press, 1972.

The problem with using PN generators to cryptographically protect an information signal is that they are extremely vulnerable to attack (i.e., the encryption is easy to crack or break). The weakness of PN generators which are based on an LFSR is primarily due to the inherent linearity of the generators. Since PN generators operate according to an algorithm, knowledge of the algorithm reveals the entire sequence. Further, as noted in chapter 5 of "Cipher Systems" by Henry Baker and Fred Piper, Northwood Publications, 1992, a cryptoanalyst needs only 2N bits of plaintext and corresponding ciphertext for an N stage long LFSR to be able to determine the feedback "taps", the initial state of the LFSR, and ultimately any PN signal output by the LFSR. This vulnerability represents a major drawback to the continued use of the LFSR to cryptographically protect communication systems.

Therefore, a need exists for a cryptographically protection technique for communication systems which can alleviate these problems.

SUMMARY OF THE INVENTION

A method and apparatus for generating a pseudo-random bit sequence is provided. A first input bit is determined as a function of bits stored in a shift register in accordance with a first feedback algorithm. In addition, a second input bit is determined as a function of bits stored in the shift register in accordance with a second feedback algorithm. Subsequently, a particular input bit to be provided to the shift register is deterministically selected from the group consisting of the first input bit and the second input bit such that a non-linear pseudo random sequence may be produced by the shift register. In addition, a communication unit which utilizes the pseudo-random bit sequence in encrypting a signal to be transmitted and decrypting a received signal is described.

DETAILED DESCRIPTION

Figure 1:
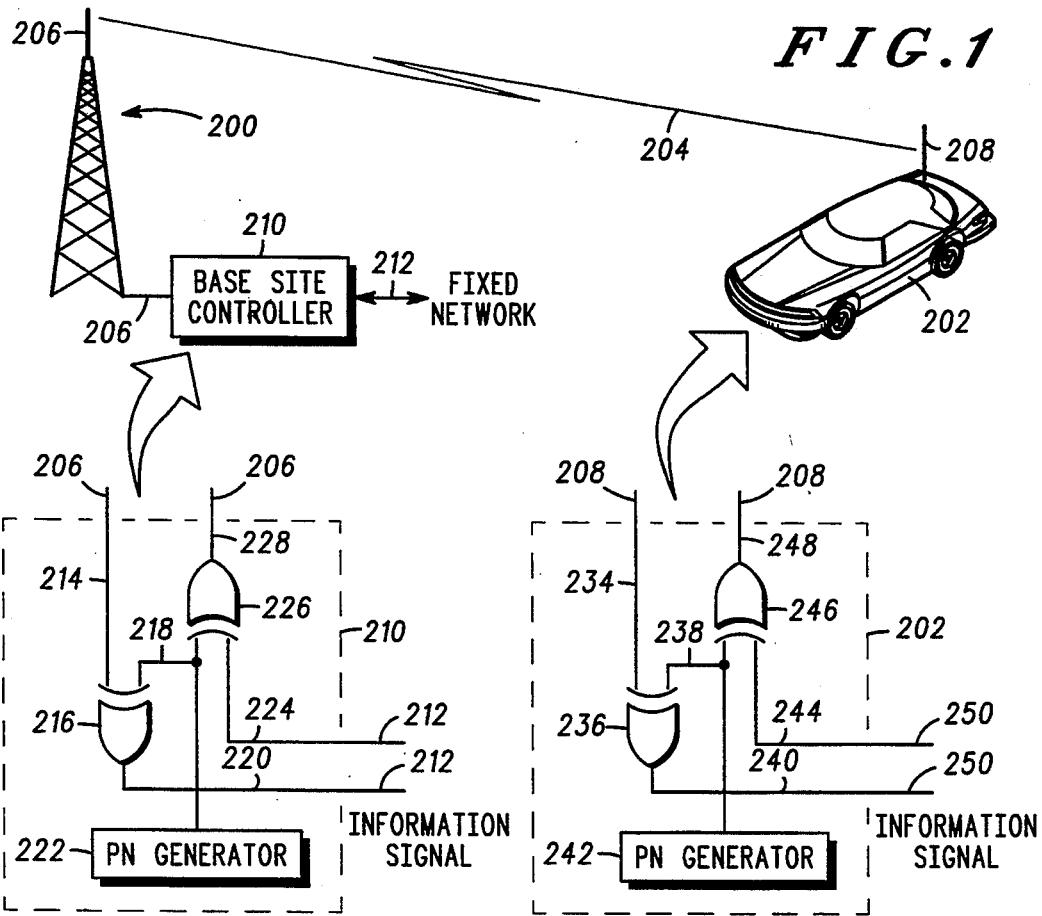
FIG. 1 is a block diagram showing a preferred embodiment cryptographic process for use in a communication system and a communication system having a subscriber unit and a fixed network communication unit in accordance with the present invention.

Referring now to FIG. 1, a preferred embodiment cryptographic process for use in a communication system having a subscriber communication unit 202 and a fixed network communication unit 200 (i.e., cellular base site)in accordance with the present invention is shown. The fixed network communication unit 200 is connected to other parts of the fixed network through a base site controller 210 by a coupler 212. The other parts of the fixed network may include, but are not limited to, other communication units, central controllers, communication system switches, or an access port on the public switched telephone network (PSTN). In operation, an information signal (i.e., a voice and/or data signal) is input to the communication system from either the fixed network (via coupler 212) or from other parts of the subscriber communication unit 202. Subsequently, the information signal is encrypted and transmitted over the communication channel 204, as well as received and decrypted by communication unit which did not transmit the information signal (i.e., either the fixed network communication unit 200 or the subscriber communication unit 202, respectively).

By way of example, the communication of an information signal from the fixed network communication unit 200 to the subscriber communication unit 202 will be described below. An information signal 212 is input to the base site controller 210 of the fixed network communication unit 200. The base site controller 210 may perform several other operations in conjunction with communicating the information signal 212 besides providing cryptographic protection. These other operations may include but not limited to error protection encoding, voice encoding (vocoding), channel coding, modulation, and signal power amplification. However, these other operations may be performed in a number of different methods which are well known in the art. As such these other operations will not be discussed further in the following description so that the it may be focused specifically on a preferred embodiment cryptographic protection scheme of the present invention.

Once the information signal 212 is input to the base site controller 210, the information signal is encrypted. The encryption preferably is accomplished by providing the incoming information signal 212, 224 to an exclusive-or (XOR) gate 226 which combines it with a pseudo-random signal 218 from a PN generator 222. In the preferred embodiment, the pseudo-random signal 218 is a non-linear signal. The method by which this non-linear pseudo-random signal 218 is generated will be discussed later in reference to FIG. 2. The output 228 of XOR gate 226 is an encrypted information signal. This encrypted information signal 228 may be further processed by the base site controller 210 prior to being operatively coupled through a signal transmission line to antenna 206 for subsequent transmission over radio communication channel 204. It will be appreciated by those skilled in the art that the incoming information signal 224 may be combined according to some other function (i.e., not an XOR function) without departing from the scope and spirit of the present invention.

A subscriber unit 202 receives the encrypted information signal by an antenna and signal transmission line 208. The received encrypted information signal 208, 234 is input to an XOR gate 236 which combines it with a pseudo-random signal 238 from a PN generator 242 to decrypt the information signal. It will be appreciated that PN generator 242 must be synchronized with PN generator 222 so that the PN signal 218, 238 output by both PN generators is in synch with the encrypted information signal. When the PN signal 238 is properly synchronized with the received encrypted information signal 234, the output 240 of the XOR gate 236 is a decrypted information signal. This decrypted information signal 240 may be further processed by the subscriber unit 202 prior to being output from the subscriber unit 202 as information signal 250.

In a similar manner, an information signal may be communicated from the subscriber communication unit 202 to the fixed network communication unit 200. An information signal 250 is input to a subscriber unit 202. The incoming information signal 250, 244 is encrypted with a non-linear pseudo-random signal 238 by an XOR gate 246. The encrypted information signal output 248 of the XOR gate 246 is coupled on a transmission line to an antenna 208 and transmitted on a radio communication channel 204. The fixed network communication unit 200 receives encrypted information signal 206 and provides it to base site controller 210. Base site controller 210 combines the received encrypted information signal 206,214 with a non-linear pseudo-random signal 218 by XOR gate 216 to decrypt the information signal. The non-linear pseudo-random signal 218 is synchronized with the non-linear pseudo-random signal 238 that was originally used to encrypt the information signal. XOR gate 216 outputs a decrypted information signal 220 which is then provided to the fixed network through a coupler 212.

Figure 2:
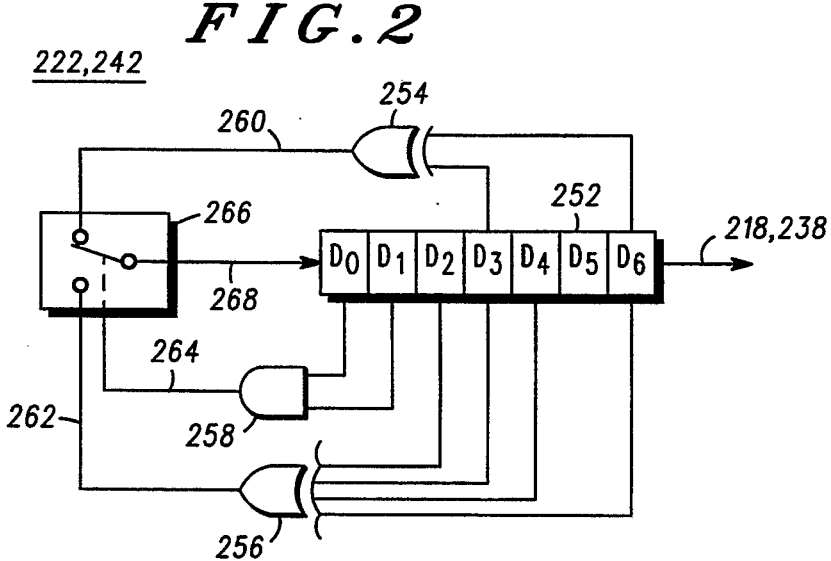
FIG. 2 is a block diagram of a preferred embodiment pseudo-random bit sequence generator to be used by either a subscriber unit or a fixed network communication unit shown in FIG. 1 in accordance with the present invention.

Turning now to FIG. 2, a block diagram of a preferred embodiment pseudo-random signal (i.e., bit sequence) generator 222, 242 to be used by either the subscriber unit 202 or the fixed network communication unit 200 is shown. By way of example, a seven bit pseudo-random bit sequence generator 222, 242 is described. However, it will be appreciated by those skilled in the art that larger pseudo-random bit sequence generators may be used in encrypting an information signal to provide better cryptographic protection of the information signal (i.e., it is more difficult to "break" or "crack" longer non-linear sequences than shorter ones). In addition, the use of these larger pseudo-random bit sequence generators does not depart from the scope and spirit of the present invention.

The seven bit pseudo-random bit sequence generator 222, 242 preferably is implemented as a feedback register that implements several polynomial functions and as such includes a shift register 252 for storing a predetermined number of bits (e.g., seven bits numbered $D_0$ through $D_6$). In addition, a first feedback circuit 254 is operatively coupled to the shift register 252. In the preferred embodiment, the first feedback circuit implements a polynomial function $x^7+x^3+1$ by "tapping" inputs for an XOR gate 254 from bits (i.e., $D_3$ and $D_6$) stored in the shift register 252. The output of XOR gate 254 determines a first input bit 260 which may be selectively input to a serial input of the shift register 252. A second feedback circuit 256 also is operatively coupled to the shift register 252. The second feedback circuit preferably implements a polynomial function $x^7+x^4+x^3+x^2+1$ by "tapping" inputs for an XOR gate 256 from bits (i.e., $D_2$, $D_3$, $D_4$, and $D_6$) stored in the shift register 252. The output of XOR gate 256 determines a second input bit 262 which may be selectively input to a serial input of the shift register 252. The first 260 and second 262 input bit are input to a feedback selection controller 266 which outputs 268 one of the two input bits to the shift register 252. Feedback selection controller 266 deterministically selects according to an algorithm a particular input bit (i.e., either input bit 260 or 262) to be provided to the shift register 252 such that a non-linear pseudo random sequence may be produced by the shift register 252 and output on serial output 218, 238. In order to ensure that the pseudo random sequence which is output 218, 238, the pseudo random bit sequence generator 222, 242 will need to be initialized and clocked through several cycles to randomly mix the output sequence. The minimal number of clock cycles required for pseudo random mixing is N, where N is the length of the shift register 252 (in this example seven clock cycles is required). In addition, to prevent susceptibility to cryptographic attack (i.e., code breaking), the feedback selection controller 266 must not select particular input bits from the same feedback circuit 254 or 256 for more than 2N clock cycles, where N is the length of the shift register 252. By selecting input bits from different feedback circuits more often, a cryptographic attacker is prevented from using a linear equation solution attack. Finally, it will be appreciated by those skilled in the art that more that two feedback circuits may be used to further enhance the non-linearity of the pseudo-random sequence 268 serially input to shift register 252.

The feedback selection controller 266 preferably includes an internal control mechanism which selects (i.e., switches between) the particular input bit according to an algorithm based on an internal input 264. The internal input 264 consists of an output of a gate function 258 of a plurality of "untapped" bits (e.g., an AND gate function of $D_0$ and $D_1$) of the shift register 252. If this internal control mechanism operates according to this algorithm, the input bits provided to the shift register 252 in a sequence according to Table 1 as shown below.

TABLE 1

| Register Stages | Control Bit | Switch | New Input Bit |
|---|---|---|---|
| 1010101 | 1·0=0 | up | 0⊕1=1 |
| 1101010 | 1·1=1 | down | 0⊕1⊕0⊕0=1 |
| 1110101 | 1·1=1 | up | 0⊕1=1 |
| 1111010 | 1·1=1 | down | 1⊕1⊕0⊕0=0 |
| 0111101 | 0·1=0 | down | 1⊕1⊕1=0 |
| 0011110 | 0·0=0 | down | 1⊕1⊕1⊕0=1 |
| 1001111 | 1·0=0 | down | 0⊕1⊕1⊕1=1 |
| 1100111 | 1·1=1 | up | 0⊕1=1 |
| 1110011 | 1·1=1 | down | 1⊕0⊕0⊕1=0 |
| 0111001 | 0·1=0 | down | 1⊕1⊕0⊕1=1 |
| . | . | . | . |
| . | . | . | . |
| . | . | . | . |

It will be appreciated that another internal control mechanism may be used (e.g., a parity bit of the shift register 252 or a function of a plurality of any bits (i.e., "tapped" or "untapped") of the shift register 252). In addition, the feedback selection controller 266 may include an external control mechanism which selects the particular input bit according to an algorithm based on an external input. Examples of external input include a linear feedback shift register output, a clock initialization signal, and a cellular automaton. Cellular automaton concepts were discussed in "Analysis of Cellular Automata Used as Pseudorandom Pattern Generators" by Paul H. Bardell in a paper presented at the 1990 International Test Conference. Further, the feedback selection controller 266 may include a combination of an internal and external control mechanism. Finally, the feedback selection controller 266 may use an entirely different control mechanism which selects the particular input bit by selecting a value from a lookup table which is addressed by a plurality of bits of the shift register 252.

The preferred embodiment of the present invention may be summarized with reference to the subscriber communication unit 202 in the following manner. A communication device for use in maintaining secure communications through an encryption process between a subscriber unit 202 and fixed network communication units 200 of a serving communication system is provided. The transmitting portion of the communication unit includes a pseudo-random bit sequence generator 242 which generates a non-linear pseudo-random bit sequence 238. The pseudo-random bit sequence generator 242 includes a shift register 252 for storing a predetermined number of bits (i.e., $D_0$ through $D_6$). In addition, a first feedback device 254 is operatively coupled to the shift register 252. The first feedback device 254 determines a first input bit 260 as a function of bits stored in the shift register 252. Further, a second feedback device 256 is operatively coupled to the shift register 252. The second feedback device 256 determines a second input bit 262 as a function of bits stored in the shift register 252. Finally, the pseudo-random bit sequence generator 242 includes a controller 266 operatively coupled to the shift register 252, the first feedback device 254, and the second feedback device 256. The controller 266 deterministically selects a particular input bit to be provided 268 to the shift register 252. This particular input bit is either the first input bit 260 or the second input bit 262.

The transmitting portion of the communication unit also includes an encrypting device 246, operatively coupled to the pseudo-random bit sequence generator 242, which encrypts an input information signal 244, 250 as a function of the non-linear pseudo-random bit sequence 238. A transmitter 208, operatively coupled to the encrypting device 246, transmits the encrypted information signal 248 over a communication channel 204.

The receiving portion of the communication device includes a receiver 208 for receiving an encrypted information signal from a communication channel 204. In addition, the receiving portion uses the same or at least a substantially similar pseudo-random bit sequence generator 242 as is used by the transmitting portion. This pseudo-random bit sequence generator 238 generates a non-linear pseudo-random bit sequence 238. Finally, a decrypting device 236, operatively coupled to the receiver 208 and the pseudo-random bit sequence generator 238, for decrypts the received encrypted information signal 234 as a function of the non-linear pseudo-random bit sequence 238 into the information signal 240, 250.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the communication channel could alternatively be an electronic data bus, wireline, optical fiber link, satellite link, or any other type of communication channel.

What is claimed is:

1. A pseudo-random bit sequence generator, comprising:

(a) shift register means for storing a predetermined number of bits;

(b) first feedback means, coupled to the shift register means, for determining a first input bit as a function of bits stored in the shift register means;

(c) second feedback means, coupled to the shift register means, for determining a second input bit as a function of bits stored in the shift register means; and (d) control means, coupled to the shift register means, the first feedback means, and the second feedback means, for deterministically selecting and providing a particular input bit to the shift register means for producing a non-linear pseudo random sequence by the shift register means, the particular input bit being selected from the group consisting of the first input bit and the second input bit.

2. The pseudo-random bit sequence generator of claim 1 wherein the control means comprises an external control mechanism which selects the particular input bit according to an algorithm based on an external input.

3. The pseudo-random bit sequence generator of claim 2 wherein the external input is selected from the group consisting of a linear feedback shift register output, a clock initialization signal, and a cellular automaton.

4. The pseudo-random bit sequence generator of claim 1 wherein the control means comprises an internal control mechanism which selects the particular input bit according to an algorithm based on an internal input.

5. The pseudo-random bit sequence generator of claim 4 wherein the internal input is selected from the group consisting of a parity bit of the shift register means, a function of a plurality of bits of the shift register means, and a function of a plurality of untapped bits of the shift register means.

6. The pseudo-random bit sequence generator of claim 1 wherein the control means comprises internal and external control mechanisms which selects the particular input bit according to an algorithm based on an internal input and an external input, respectively.

7. The pseudo-random bit sequence generator of claim 6 wherein:
   (a) the algorithm comprises logically combining the internal input and the external input into a selection signal;
   (b) the internal input is selected from the group consisting of a parity bit of the shift register means, a function of a plurality of bits of the shift register means, and a function of a plurality of untapped bits and of the shift register means; and
   (c) the external input is selected from the group consisting of a linear feedback shift register output, a clock initialization signal, and a cellular automaton.

8. The pseudo-random bit sequence generator of claim 1 the control means comprises a mechanism for selecting the particular input bit according to an algorithm consisting of selecting a value from a lookup table which is addressed by a plurality of bits of the shift register means.

9. A communication device for use in maintaining secure communications through an encryption process between a subscriber unit and a fixed network communication unit of a serving communication system, comprising:
   (a) a pseudo-random bit sequence generator means for generating a non-linear pseudo-random bit sequence, the pseudo-random bit sequence generator means comprising:
      (i) shift register means for storing a predetermined number of bits;
      (ii) first feedback means, coupled to the shift register means, for determining a first input bit as a function of bits stored in the shift register means;
      (iii) second feedback means, coupled to the shift register means, for determining a second input bit as a function of bits stored in the shift register means; and
      (iv) control means, coupled to the shift register means, the first feedback means, and the second feedback means, for deterministically selecting and providing a particular input bit to the shift register means, the particular input bit being selected from the group consisting of the first input bit and the second input bit;
   (b) encrypting means, coupled to the pseudo-random bit sequence generator means, for encrypting an input information signal as a function of the non-linear pseudo-random bit sequence; and
   (c) transmitting means, coupled to the encrypting means, for transmitting the encrypted information signal over a communication channel.

10. The communication device of claim 9 wherein the communication device is selected from the group consisting of the subscriber unit and the fixed network communication unit of the serving communication system.

11. A communication device for use in maintaining secure communications through an encryption process between a subscriber unit and a fixed network communication unit of a serving communication system, comprising:
   (a) receiving means for receiving an encrypted information signal from a communication channel.
   (b) a pseudo-random bit sequence generator means for generating a non-linear pseudo-random bit sequence, the pseudo-random bit sequence generator means comprising:
      (i) shift register means for storing a predetermined number of bits;
      (ii) first feedback means, coupled to the shift register means, for determining a first input bit as a function of bits stored in the shift register means;
      (iii) second feedback means, coupled to the shift register means, for determining a second input bit as a function of bits stored in the shift register means; and
      (iv) control means, coupled to the shift register means, the first feedback means, and the second feedback means, for deterministically selecting and providing a particular input bit to the shift register means, the particular input bit being selected from the group consisting of the first input bit and the second input bit; and
   (c) decrypting means, coupled to the receiving means and the pseudo-random bit sequence generator means, for decrypting the received encrypted information signal as a function of the non-linear pseudo-random bit sequence.

12. The communication device of claim 11 wherein the communication device is selected from the group consisting of the subscriber unit and the fixed network communication unit of the serving communication system.

13. A method for generating a pseudo-random bit sequence, comprising:
   (a) determining a first input bit as a function of bits stored in a shift register in accordance with a first feedback algorithm;
   (b) determining a second input bit as a function of bits stored in the shift register in accordance with a second feedback algorithm; and
   (c) deterministically selecting and providing a particular input bit to the shift register and producing a non-linear pseudo random sequence by the shift register, the particular input bit being selected from the group consisting of the first input bit and the second input bit.

14. The method of claim 13 wherein the step of deterministically selecting a particular input bit is based on an external input selected from the group consisting of a linear feedback shift register output, a clock initialization signal, and a cellular automaton.

15. The method of claim 13 wherein the step of deterministically selecting a particular input bit is based on an internal input selected from the group consisting of a parity bit of the shift register, a function of a plurality of bits of the shift register, and a function of a plurality of untapped bits of the shift register.

16. The method of claim 13 wherein the step of deterministically selecting a particular input bit is based on a selection signal derived from logically combining an internal input and an external input, the internal input being selected from the group consisting of a parity bit of the shift register, a function of a plurality of bits of the shift register, and a function of a plurality of untapped bits and of the shift register, and the external input being selected from the group consisting of a linear feedback shift register output, a clock initialization signal, and a cellular automaton.

17. The method of claim 13 wherein the step of deterministically selecting a particular input bit comprises selecting a value from a lookup table which is addressed by a plurality of bits of the shift register.

* * * * *